(12) United States Patent
Ishihara et al.

(10) Patent No.: US 8,951,677 B2
(45) Date of Patent: *Feb. 10, 2015

(54) MICROPOROUS MEMBRANES, METHODS FOR MAKING SUCH MEMBRANES, AND THE USE OF SUCH MEMBRANES AS BATTERY SEPARATOR FILM

(75) Inventors: Takeshi Ishihara, Nasushiobara (JP); Satoshi Miyaoka, Nasushiobara (JP); Koichi Kono, Nasushiobara (JP); Patrick Brant, Seabrook, TX (US)

(73) Assignee: Toray Battery Separator Film Co., Ltd. (JP)

( * ) Notice: Subject to any disclaimer, the term of this patent is extended or adjusted under 35 U.S.C. 154(b) by 270 days.

This patent is subject to a terminal disclaimer.

(21) Appl. No.: 13/322,631

(22) PCT Filed: Jun. 8, 2010

(86) PCT No.: PCT/US2010/037755
§ 371 (c)(1), (2), (4) Date: Nov. 28, 2011

(87) PCT Pub. No.: WO2010/147798
PCT Pub. Date: Dec. 23, 2010

(65) Prior Publication Data
US 2012/0088149 A1  Apr. 12, 2012

Related U.S. Application Data

(60) Provisional application No. 61/218,720, filed on Jun. 19, 2009, provisional application No. 61/298,756, filed on Jan. 27, 2010, provisional application No. 61/298,752, filed on Jan. 27, 2010, provisional application No. 61/346,675, filed on May 20, 2010, provisional application No. 61/351,380, filed on Jun. 4, 2010.

(30) Foreign Application Priority Data

Aug. 19, 2009  (EP) ..................................... 09168193

(51) Int. Cl.
*H01M 2/16* (2006.01)
*B32B 27/32* (2006.01)
(Continued)

(52) U.S. Cl.
CPC ............ *H01M 2/1653* (2013.01); *H01M 2/145* (2013.01); *H01M 2/1686* (2013.01); *H01M 10/0525* (2013.01); *Y02T 10/7011* (2013.01)
USPC ........ 429/254; 429/246; 429/249; 428/315.5; 428/319.9

(58) Field of Classification Search
USPC .................. 429/62, 129, 144, 207, 254, 246; 525/240; 264/210.1, 210.6
See application file for complete search history.

(56) References Cited

U.S. PATENT DOCUMENTS 5,084,534 A    1/1992  Welborn, Jr. et al.
5,453,333 A *  9/1995  Takauchi et al. ................ 429/62
(Continued)

FOREIGN PATENT DOCUMENTS

JP    59-196706    11/1984
JP    60-242035    12/1985
(Continued)

OTHER PUBLICATIONS

Machine Translation of: JP 2005-171230 A, Masuda et al., Jun. 30, 2005.*
(Continued)

*Primary Examiner* — Kenneth Douyette
(74) *Attorney, Agent, or Firm* — DLA Piper LLP (US)

(57) ABSTRACT

The present invention relates to microporous membranes comprising polymer and having well-balanced permeability and heat shrinkage, especially heat shrinkage at elevated temperature. The invention also relates to methods for making such membranes, and the use of such membranes as battery separator film in, e.g., lithium ion secondary batteries.

8 Claims, 1 Drawing Sheet

(51) Int. Cl.
*H01M 2/14* (2006.01)
*H01M 10/0525* (2010.01)

(56) References Cited

U.S. PATENT DOCUMENTS

| | | | |
|---|---|---|---|
| 5,534,593 A * | 7/1996 | Friedman | 525/240 |
| 6,096,213 A | 8/2000 | Radovanovic et al. | |
| 8,338,020 B2 * | 12/2012 | Ishihara et al. | 429/145 |
| 2001/0008733 A1 * | 7/2001 | Tanaka et al. | 429/247 |
| 2004/0224226 A1 * | 11/2004 | Endo et al. | 429/184 |
| 2006/0147804 A1 * | 7/2006 | Yamamoto et al. | 429/254 |
| 2007/0128512 A1 * | 6/2007 | Kaimai et al. | 429/144 |
| 2007/0160902 A1 * | 7/2007 | Ando et al. | 429/144 |
| 2009/0169862 A1 * | 7/2009 | Rhee et al. | 428/315.7 |
| 2009/0274955 A1 * | 11/2009 | Kikuchi et al. | 429/144 |
| 2010/0003588 A1 * | 1/2010 | Sudou et al. | 429/129 |

FOREIGN PATENT DOCUMENTS

| | | | | |
|---|---|---|---|---|
| JP | 61-227804 | 10/1986 | | |
| JP | 07-060084 | 3/1995 | | |
| JP | 2004-161899 | 6/2004 | | |
| JP | 3634397 | 1/2005 | | |
| JP | 2005-145999 | 6/2005 | | |
| JP | 2005/171230 A1 * | 6/2005 | | |
| WO | WO 2008/018584 A1 * | 2/2004 | | H01M 2/16 |
| WO | 2007/052663 | 5/2007 | | |
| WO | 2007/132942 | 11/2007 | | |
| WO | 2008/016174 | 2/2008 | | |
| WO | 2008/140835 | 11/2008 | | |

OTHER PUBLICATIONS

Sun, T. et al., "Effect of Short Chain Branching on the Coil Dimensions of Polyolefins in Dilute Solution," *Macromolecules*, 2001, vol. 34, No. 19, pp. 6812-6820 (1 page Abstract).

* cited by examiner

MICROPOROUS MEMBRANES, METHODS FOR MAKING SUCH MEMBRANES, AND THE USE OF SUCH MEMBRANES AS BATTERY SEPARATOR FILM

CROSS REFERENCE RELATED TO APPLICATION

The present application claims priority from U.S. Ser. No. 61/218,720, filed Jun. 19, 2009 and EP 09168193.2, filed Aug. 19, 2009, and claims the benefit of and priority from U.S. Ser. No. 61/298,752, filed Jan. 27, 2010; U.S. Ser. No. 61/298,756, filed Jan. 27, 2010; U.S. Ser. No. 61/346,675, filed May 20, 2010, and U.S. Ser. No. 61/351,380, filed Jun. 4, 2010, all of which are incorporated by reference in their entirety.

FIELD OF THE INVENTION

The present invention relates to microporous membranes comprising polymer and having well-balanced permeability and heat shrinkage, especially heat shrinkage at elevated temperature. The invention also relates to methods for making such membranes, and the use of such membranes as battery separator film in, e.g., lithium ion secondary batteries.

BACKGROUND OF THE INVENTION

Microporous membranes are useful as separators for primary and secondary batteries. Such batteries include lithium ion secondary batteries, lithium-polymer secondary batteries, nickel-hydrogen batteries, nickel-cadmium batteries, nickel-zinc batteries, silver-zinc batteries, etc.

It is desirable for a battery separator film to have a relatively low heat shrinkage, especially high temperature, in order to prevent internal short circuits. Microporous membranes having a heat shrinkage in the range of about 1.0% to 10.0% at 105° C. have been made using polyolefin. For example, JP60-242035A discloses a membrane made by a process comprising molding a gel-like sheet made by extruding a solution containing solvent and polyolefin having a weight average molecular weight $\geq 7.0 \times 10^5$, removing the solvent from the gel-like sheet, and then stretching the gel-like sheet.

It is also desirable for microporous membranes to have a relatively high meltdown temperature and a relatively low shutdown temperature to improve battery safety margin. Japanese patent applications JP59-196706A and JP61-227804A disclose the use of polymethylpentene (PMP) to increase membrane meltdown temperature. These membranes, however, have a relatively high shutdown temperature. Japanese patent applications JP07-060084A and JP3634397B disclose microporous membrane comprising polyethylene and polymethylpentene, the membrane being produced by mixing polyethylene and polymethylpentene with solvent or third polymer. The film is said to have a relatively low shutdown temperature and a relatively high meltdown temperature. Further, U.S. Pat. No. 6,096,213 discloses a method for making membrane comprising polyethylene and polymethylpentene without using any solvent or third polymer. Japanese patent application JP2004-161899A discloses a microporous membrane comprising polyethylene and polymethylpentene having a relatively high air permeability and a low heat shrinkage at 105° C. Japanese patent application JP2005-145999 discloses a microporous membrane comprising polymethylpentene and alpha-olefin copolymer. While polymethylpentene has been used to improve the properties of microporous membranes, further improvements are desired.

SUMMARY OF THE INVENTION

In an embodiment, the invention relates to a microporous membrane having at least one layer, the layer comprising polymethylpentene in an amount in the range of 22.0 wt. % to 40.0 wt. % based on the weight of the layer, the membrane having an air permeability $\leq 1.0 \times 10^3$ seconds/100 cm$^3$/20 µm, a TD heat shrinkage at 105° C. $\leq 2.1$%, and a TD heat shrinkage at 130° C. <25.0%.

In another embodiment, the invention relates to a process for producing a microporous membrane, comprising:
(1) extruding a mixture comprising diluent and polymer to produce an extrudate having at least one layer, the layer comprising 22.0 wt. % to 40.0 wt. % of polymethylpentene based on the weight of the polymer in the layer;
(2) stretching the extrudate in at least one planar direction; and
(3) removing at least a portion of the diluent from the stretched extrudate.

In another embodiment the invention relates to the microporous membrane produced by the preceding process.

In another embodiment, the invention relates to a battery comprising an electrolyte, an anode, a cathode, and a separator situated between the anode and the cathode, wherein the separator comprises a microporous membrane of any preceding embodiment.

In yet another embodiment, the invention relates to the use of such a battery as a power source in, e.g., an electric vehicle, hybrid electric vehicle, power tool, computer, mobile phone, consumer electronics, etc.

BRIEF DESCRIPTION OF THE FIGURES

(FIG. 3). The figures show that a polymethylpentene content of <22.0 wt. % results in lower meltdown temperature and increased 105.0° C. heat shrinkage, but a content of >40.0 wt. % diminishes air permeability.

DETAILED DESCRIPTION OF THE INVENTION

The invention is based on the discovery of microporous membranes comprising polymethylpentene ("PMP") and having desirable air permeability, meltdown temperature, and heat shrink values resulting from the selection of PMP amount. As shown in the FIG. 1, membrane air permeability decreases significantly when the PMP content is >40.0 wt. %. The membrane's meltdown temperature increases significantly when PMP content is ≥22.0 wt. %. The membrane's 105.0° C. heat shrinkage (shown in FIG. 3) is relatively high when PMP content is <22.0 wt. %, but decreases significantly above this value. The PMP used in the membranes exemplified in FIGS. 1-3 has a Tm of 222.0° C. and an MFR of 21 dg/min. (Mitsui Chemicals, Inc. TPX: MX002).

Figure 1:
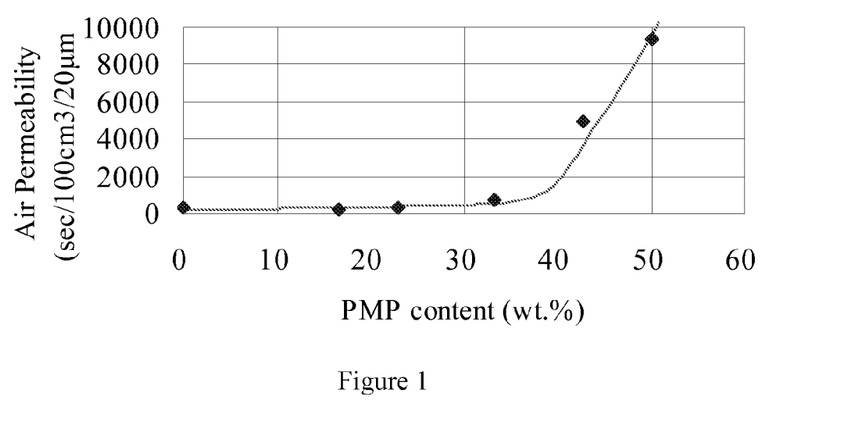
FIGS. 1-3 illustrate the effect of polymethylpentene content on membrane air permeability (FIG. 1), meltdown temperature (FIG. 2) and TD heat shrinkage at 105.0° C.
Figure 2:
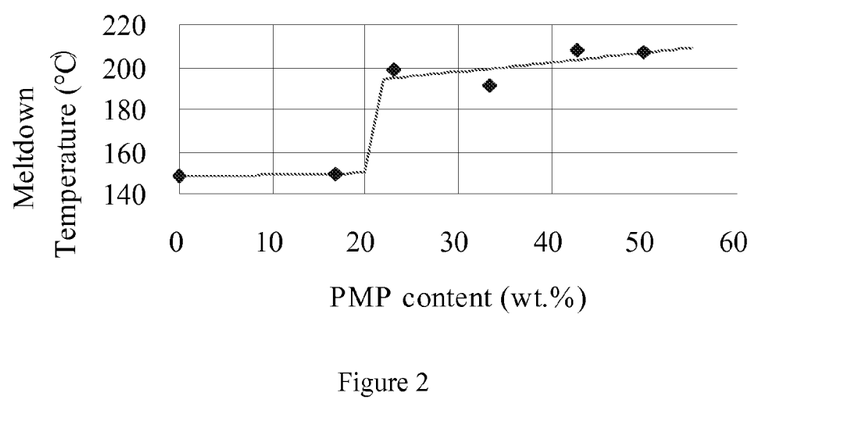
Figure 3:
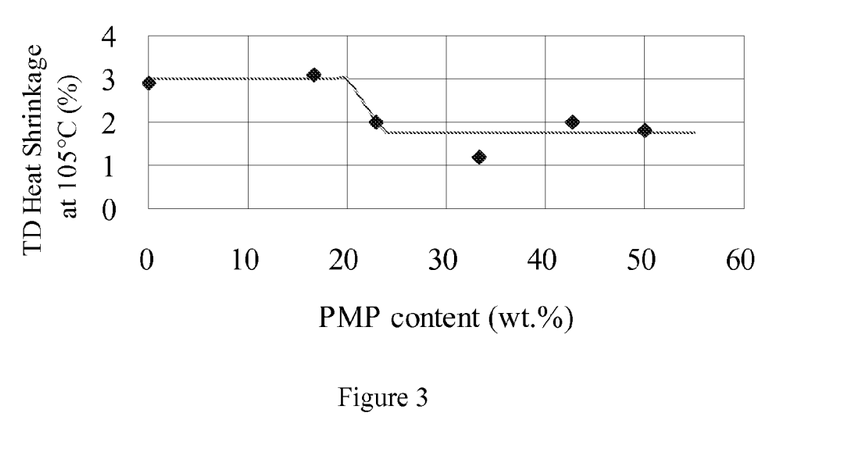

These test results for these membranes are tabulated in Table A, together with air permeability, meltdown heat shrinkage values (TD) at 130.0° C. and 170.0° C., which are representative of the membrane's thermal stability in batteries at overcharge or short-circuit conditions. Membrane PMP content is in the range of 0 wt. % to 50.0 wt. %, based on the weight of the membrane, with the remainder being polyethylene.

TABLE A

Effect of PMP Content

| PMP Content (wt. %) | Normalized Air Permeability (sec/100 cm$^3$/ 20 μm) | Meltdown Temperature (° C.) | TD Heat Shrinkage | | |
|---|---|---|---|---|---|
| | | | 105° C. (%) | 130° C. (%) | 170° C. (%) |
| 0 | 269 | 148.0 | 2.9 | 34.7 | Break |
| 16.7 | 162 | 149.6 | 3.1 | 24.6 | 33.5 |
| 23.0 | 357 | 198.4 | 2.0 | 22.8 | 23.7 |
| 33.3 | 692 | 191.1 | 1.2 | — | — |
| 42.8 | 4967 | 207.6 | 2.0 | 9.8 | 18.6 |
| 50.0 | 9405 | 206.6 | 1.8 | — | 18.1 |

Examples of polymers used to produce the microporous membrane will now be described in more detail. While the invention is described in terms of these embodiments, it is not limited thereto, and this description is not meant to foreclose other embodiments within the broader scope of the invention.

[1] Materials Used to Produce the Microporous Polyolefin Membrane

In an embodiment the microporous membrane is made by extruding a mixture of PMP, polyolefin and diluent. The diluent can be a solvent for the PMP and the polyolefin. When PMP and polyolefin are soluble in or miscible with the diluent, the polymer-diluent mixture can be called a polymeric solution. When the polyolefin is a mixture of polyolefins, e.g., a combination of several polyethylenes and/or polypropylene, it can be called a polymeric composition. The polyolefin can be a mixture of individual polymer components or a reactor blend, for example. In an embodiment, the membrane is produced from diluent and a mixture of PMP and the polyolefin, where the diluent is a solvent for the mixture of PMP and polyolefin, such as liquid paraffin. The PMP and the polyolefin will now be described in more detail.

Polymethylpentene

The PMP comprises homopolymer or copolymer having recurring methylpentene units. Optionally, the PMP comprises polymer or copolymer wherein at least 80.0% (by number) of the recurring units are methylpentene units. The desired PMP has a melting temperature (Tm)≥200.0° C., e.g., in the range of from 200.0° C. to 236.0° C., such as from 200.0° C. to about 230.0° C., or from about 210.0° C. to about 230.0° C. It has been observed that when the membrane contains PMP having a Tm>236.0° C., it can be more difficult to produce a membrane that retains mechanical strength when exposed to a temperature >170.0° C. It has also been observed that when the membrane contains PMP having a Tm<200.0° C., it is more difficult to produce a membrane having a relatively high meltdown temperature even at PMP amounts in the desired range of 22.0 wt. % to 40.0 wt. % based on the weight of the membrane.

Optionally, the PMP has a melt flow rate ("MFR" measured according to A.S.T.M. D 1238; 260° C./5.0 kg)≤80.0 dg/min., for example from about 0.5 dg/min. to 80.0 dg/min., such as from about 1 dg/min. to about 60 dg/min. When the MFR of PMP is larger than 80.0 dg/min., it can be more difficult to produce a membrane having a relatively low heat shrinkage. In an embodiment, the PMP has a Tm in the range of 221° C. to 229° C. and an MFR in the range of 20.0 dg/min. to 25.0 dg/min. It has been observed that using a PMP having an MFR and Tm in these ranges results in a finished membrane having a desirable morphology, e.g., co-continuous PMP and polyethylene phases. In one or more embodiments, the PMP has an Mw in the range of $1.0 \times 10^4$ to $4.0 \times 10^6$. The PMP's Mw and MWD can be determined by gel permeation chromatography methods similar to those described below for polypropylene, as exemplified in "*Macromolecules*, Vol. 38, pp. 7181-7183 (2005)." When the PMP content is <22.0 wt. %, based on the weight of the membrane, such as <20.0 wt. %, or <10.0 wt. %, the PMP phase was observed to be discontinuous, e.g., in the form of islands dispersed in the continuous polyethylene phase. It is believed that the co-continuous PMP phase leads to improved melt down, permeability, and heat shrinkage characteristics in the membrane.

The PMP content in the polymer of the polymer-diluent mixture is in the range of from 22.0 wt. % to 40.0 wt. %, for example from 22.0 wt. % to 38.0 wt. %, such as from about 25 wt. % to 38.0 wt. %, or from about 25.0 wt. % to about 35.0 wt. %, based on the weight of the polymer in the polymer-diluent mixture, with the balance of the polymer optionally comprising other polyolefin.

The PMP can be produced, e.g., in a polymerization process using a Ziegler-Natta catalyst system (such as catalyst systems containing titanium or titanium and magnesium) or a single site catalyst". In an embodiment, the PMP is produced using methylpentene-1 monomer, such as 4-methylpentene-1, or methylpentene-1 with one or more comonomers, such as α-olefin by coordination polymerization. Optionally, the α-olefin is one or more of butane-1, pentene-1,3-methylbutene-1, hexene-1,4-methylpentene-1, heptene-1, octane-1, nonene-1, and decene-1. Cyclic comonomer(s) such as cyclopentene, 4-methylcyclopentene, norbornene, tricyclo-3-decene, etc., can also be used. In an embodiment, the comonomer is hexene-1. The comonomer content in the PMP is generally 20.0 mol. %.

The PMP can be a mixture of PMPs (e.g., dry mixed or a reactor blend), to produce a mixture having a Tm in the range of 200.0° C. to 236.0° C.

Polyolefin

In an embodiment, the polymer of the polymer-diluent mixture further comprises polyolefin such as polyethylene (PE). The PE comprises homopolymer or copolymer having recurring ethylene units. Optionally, the PE comprises polyolefin homopolymer or copolymer wherein at least 80% (by number) of the recurring units are ethylene units. In an embodiment, the PE has a weight average molecular weight ("Mw") in the range of from $1.0 \times 10^5$ to $2.0 \times 10^6$, e.g., from $1.0 \times 10^5$ to about $1 \times 10^6$, such as about $3.0 \times 10^5$ to about $8.0 \times 10^5$. Optionally, the amount of PE in the polymer of the polymer-diluent mixture is in the range of from 60.0 wt. % to 78.0 wt. %, about 62.0 wt. % to 75.0 wt. %, such as about 65.0 wt. % to about 75.0 wt. %, based on the weight of the polymer in the polymer-diluent mixture.

PE1

Optionally, the PE comprises a first polyethylene ("PE1"), wherein PE1 has an Mw<$1.0 \times 10^6$, e.g., in the range of from $1.0 \times 10^5$ to $9.0 \times 10^5$, e.g., in the range of from $1.0 \times 10^5$ to about $7.0 \times 10^5$, for example from $1.0 \times 10^5$ to about $5.0 \times 10^5$. Optionally, PE1 has a molecular weight distribution ("MWD", defined as weight average molecular weight/number average molecular weight)≤50.0, e.g., in the range of from about 1.5 to 30.0, such as from about 3 to about 20. The PE1 can be a mixture of polyethylene (e.g., a dry mixture or reactor blend) to produce a mixture having an Mw<$1.0 \times 10^6$.

In an embodiment, PE1 is at least one of (i) an ethylene homopolymer or (ii) a copolymer of ethylene and ≤10.0 mol. % of a comonomer, based on 100.0% by mole of the copolymer The comonomer can be, for example, one or more of propylene, butene-1, pentene-1, hexene-1,4-methylpentene-1, octene-1, vinyl acetate, methyl methacrylate, styrene, or other comonomer. Such a polymer or copolymer can be produced, for example in a polymerization process using a Ziegler-Natta catalyst system (such as catalyst systems containing titanium or magnesium) or a single site catalyst. Optionally, PE1 has an amount of terminal unsaturation ≤0.14 per $1.0 \times 10^4$ carbon atoms, or ≤0.12 per $1.0 \times 10^4$ carbon atoms, e.g., in the range of 0.05 to 0.14 per $1.0 \times 10^4$ carbon atoms (e.g., below the detection limit of the measurement). PE1 can be, e.g., SUNFINE® SH-800 or SH-810 high density PE, available from Asahi Kasei Chemicals Corporation.

Optionally, PE1 has a Tm>130.0° C. It has been observed that when Tm is >130.0° C., the resultant microporous film has improved strength.

In an embodiment, the amount of PE1 in the polymer of the polymer-diluent mixture is ≥10 wt. %, e.g., in the range of from 10.0 wt. % to 78.0 wt. %, such as about 15.0 wt. % to 60 wt. %, or about 15.0 wt. % to about 45.0 wt. %, based on the weight of the polymer in the polymer-diluent mixture.

PE2

In an embodiment, the PE comprises a second polyethylene ("PE2") having $\geq 1.0 \times 10^6$, e.g., in the range of from $1.0 \times 10^6$ to $1.5 \times 10^7$, such as in the range of $1.0 \times 10^6$ to about $1.0 \times 10^7$, for example from $1.0 \times 10^6$ to about $5.0 \times 10^6$. Optionally, the PE2 has an MWD≤50.0, e.g., from about 1.5 to 30.0, such as from about 4.0 to about 20.0 or about 4.5 to about 10.0. In an embodiment, PE2 is an ethylene homopolymer or a copolymer of ethylene and a comonomer such as propylene, butene-1, hexene-1, etc. When used, the comonomer is generally present in a relatively small amount compared to the amount of ethylene. For example, the amount is generally less than 1 mol %. The comonomer can be, for example, one or more of propylene, butene-1, pentene-1, hexene-1,4-methylpentene-1, octene-1. Such a polymer or copolymer can be produced, for example in a polymerization process using a Ziegler-Natta catalyst system (such as catalyst systems containing titanium or magnesium) or a single site catalyst. Such a PE can have a melting point ≥134° C. PE2 can be ultra-high molecular weight polyethylene ("UHMWPE"), e.g., HI-ZEX MILLION® 240-m polyethylene, available from Mitsui Chemicals, Inc.

Optionally, PE2 has a Tm>130.0° C. It has been observed that when Tm temperature is >130.0° C., the resultant microporous film has improved strength.

In an embodiment, the amount of PE2 in the polymer of the polymer-diluent mixture is ≤50.0 wt. %, e.g., ≤about 45.0 wt. %, such as ≤about 40.0 wt. %, or in the range of from about 1.0 wt. % to about 40.0 wt. %, based on the weight of the polymer in the polymer-diluent mixture.

Polypropylene

In an embodiment, the polymer in the polymer-diluent mixture comprises polypropylene ("PP") having an Mw in the range of from $1.0 \times 10^4$ to $1.0 \times 10^7$, e.g., in the range of from about $1.0 \times 10^5$ to $5.0 \times 10^6$, for example from about $5.0 \times 10^5$ to about $1.5 \times 10^6$. Optionally, the PP has a Tm≥150.0° C. Such a polymer or copolymer can be produced, for example in a polymerization process using a Ziegler-Natta catalyst system (such as catalyst systems containing titanium or magnesium) or a single site catalyst. In an embodiment, the amount of PP in the polymer of the polymer-diluent mixture is ≤68.0 wt. %, e.g., in the range of 1.0 wt. % to 25.0 wt. %, such as 2.5 wt. % to 20.0 wt. % based on the weight of the polymer in the polymer-diluent mixture.

In an embodiment, the PP has an Mw>$9.0 \times 10^5$, for example in the range of from about $1.0 \times 10^6$ to about $2.0 \times 10^6$. Optionally, the PP has an MWD≤20.0, e.g., from about 1.5 to about 10.0; and a heat of fusion ("ΔHm")≥100 J/g, e.g., 110 J/g to 120 J/g, such as from about 113 J/g to 119 J/g or from 114 J/g to about 116 J/g. The PP can be, for example, one or more of (i) a propylene homopolymer or (ii) a copolymer of propylene and ≤10.0 mol. % of a comonomer. The copolymer can be a random or block copolymer. The comonomer can be, for example, one or more of α-olefins such as ethylene, butene-1, pentene-1, hexene-1,4-methylpentene-1, octene-1, vinyl acetate, methyl methacrylate, and styrene, etc.; and diolefins such as butadiene, 1,5-hexadiene, 1,7-octadiene, 1,9-decadiene, etc.

Optionally, the PP has one or more of the following properties: (i) isotactic tacticity; (ii) an elongational viscosity ≥about $5.0 \times 10^4$ Pa sec at a temperature of 230° C. and a strain rate of 25 $sec^{-1}$; (iii) a melting peak Tm (second melt)≥about 160.0° C., e.g., in the range of about 162° C. to 170° C.; (iv) a Trouton's ratio≥about 15 when measured at a temperature of about 230° C. and a strain rate of 25 $sec^{-1}$; (v) an Mw in the range from about $1.1 \times 10^6$ to about $1.75 \times 10^6$; an MWD in the range of 2.0 to 6.0; (vii) a Melt Flow Rate ("MFR"; ASTM D-1238-95 Condition L at 230° C. and 2.16 kg)≤about 0.01 dg/min (i.e., a value is low enough that the MFR is essentially not measurable); (viii) exhibits an amount of stereo defects ≤about 50 per 10,000 carbon atoms, e.g., ≤about 20, or ≤about 10.0, such as ≤about 5.0 per 10,000 carbon atoms; (ix) a meso pentad fraction ≥about 96 mol % mmmm pentads; and/or (x) an amount extractable species (extractable by contacting the PP with boiling xylene)≤0.5 wt. %, e.g., ≤0.2 wt. %, such as ≤0.1 wt. % or less based on the weight of the PP.

A non-limiting example of the PP and methods for measuring the PP's tacticity, stereo defects, ΔHm, etc. are described in PCT Patent Publication No. WO 2008/140835, which is incorporated by reference herein in its entirety.

Low-Tm Polyolefin

Optionally, the polymer in the polymer-diluent mixture contains a relatively low-Tm polyolefin, such as a polyolefin having a Tm≤130.0° C., e.g., in the range of from 115.0° C. to 130.0° C. and an Mw in the range of from $5.0 \times 10^3$ to $4.0 \times 10^5$. Optionally, the low-Tm polyolefin has a Tm in the range of from about 120.0° C. to about 128.0° C. and an Mw from about $5.0 \times 10^3$ to about $1.0 \times 10^5$, such as from about 122.0° C. to about 126.0° C.; and optionally has an Mw in the range of from about $8.0 \times 10^3$ to about $5.0 \times 10^4$. Using a low-Tm polyolefin can decrease the shutdown temperature of the resulting microporous film.

In an embodiment, the polymer of the polymer-diluent mixture contains the low-Tm polyolefin in an amount 30.0 wt. %, such as in the range of 1.0 wt. % to 25.0 wt. %. In an embodiment, the low-Tm polyolefin comprises a copolymer of ethylene and a comonomer such as α-olefin. The comonomer is generally present in a relatively small amount compared to the amount of ethylene. For example, the comonomer amount is generally less than 10.0% by mole based on 100.0% by mole of the copolymer, such as from 1.0% to 5.0% by mol. The comonomer can be, for example, one or more of propylene, butene-1, pentene-1, hexene-1,4-methylpentene-1, octene-1, vinyl acetate, methyl methacrylate, styrene, or other monomers. Such a polymer or copolymer can be produced using any suitable catalyst, including a single-site catalyst. For example, the polymer can be produced according to the methods disclosed in U.S. Pat. No. 5,084,534 (such as the methods disclosed therein in examples 27 and 41), which is incorporated by reference herein in its entirety.

Tm, Mw and MWD Determination

Mw and MWD of the polyolefin is determined using a High Temperature Size Exclusion Chromatograph, or "SEC", (GPC PL 220, Polymer Laboratories), equipped with a differential refractive index detector (DRI). The measurement is made in accordance with the procedure disclosed in "*Macromolecules*, Vol. 34, No. 19, pp. 6812-6820 (2001)". Three PLgel Mixed-B columns available from (available from Polymer Laboratories) are used for the Mw and MWD determination. For PE, the nominal flow rate is 0.5 cm$^3$/min; the nominal injection volume is 300 µL; and the transfer lines, columns, and the DRI detector are contained in an oven maintained at 145° C. For polypropylene, the nominal flow rate is 1.0 cm$^3$/min; the nominal injection volume is 300 µL; and the transfer lines, columns, and the DRI detector are contained in an oven maintained at 160° C.

The GPC solvent used is filtered Aldrich reagent grade 1,2,4-Trichlorobenzene (TCB) containing approximately 1000 ppm of butylated hydroxy toluene (BHT). The TCB was degassed with an online degasser prior to introduction into the SEC. The same solvent is used as the SEC eluent. Polymer solutions were prepared by placing dry polymer in a glass container, adding the desired amount of the TCB solvent, and then heating the mixture at 160° C. with continuous agitation for about 2 hours. The concentration of polymer solution was 0.25 to 0.75 mg/ml. Sample solution are filtered off-line before injecting to GPC with 2 µm filter using a model SP260 Sample Prep Station (available from Polymer Laboratories).

The separation efficiency of the column set is calibrated with a calibration curve generated using a seventeen individual polystyrene standards ranging in Mp ("Mp" being defined as the peak in Mw) from about 580 to about 10,000,000. The polystyrene standards are obtained from Polymer Laboratories (Amherst, Mass.). A calibration curve (log Mp vs. retention volume) is generated by recording the retention volume at the peak in the DRI signal for each PS standard and fitting this data set to a 2nd-order polynomial. Samples are analyzed using IGOR Pro, available from Wave Metrics, Inc.

Tm is measured in accordance with JIS K7122. Namely, a sample of the resin (0.5-mm-thick molding melt-pressed at 210° C.) is placed at ambient temperature in a sample holder of a differential scanning calorimeter (Pyris Diamond DSC available from Perkin Elmer, Inc.), heat-treated at 230° C. for 1 minute in a nitrogen atmosphere, cooled to 30° C. at 10° C./minute, kept at 30° C. for 1 minute, and heated to 230° C. at a speed of 10° C./minute.

During melting, a polymer may show secondary melting peaks adjacent to the principal peak, and/or the end-of-melt transition, but for purposes herein, such secondary melting peaks are considered together as a single melting point, with the highest of these peaks being considered the Tm.

[2] Method for Producing the Microporous Membrane

In an embodiment, the microporous membrane is a monolayer (i.e., single-layer) membrane produced from the extrudate. The extrudate can be produced from PMP, polyolefin and diluent as follows.

In an embodiment, the microporous membrane is produced by a process comprising: (1) combining diluent and polymer (including PMP as described above), (2) extruding the combined polymer and diluent through a die to form an extrudate; (3) optionally cooling the extrudate to form a cooled extrudate, e.g., a gel-like sheet; (4) stretching the extrudate or cooled extrudate in at least one planar direction, e.g., stretching in the transverse direction the machine direction, or both; and (5) removing at least a portion of the diluent from the extrudate or cooled extrudate to form a membrane.

Optionally, the process further comprises (6) removing at least a portion of any remaining volatile species from the membrane at any time after step (5).

Optionally, the process further comprises (7) subjecting the membrane to a thermal treatment (such as heat setting or annealing) at any time after step (5).

Optionally, the process further comprises stretching the membrane in at least one planar direction at any time after step (5), e.g., between steps (6) and (7). For example, the process can further comprise (8) stretching the dried membrane of step (6) in the machine direction from the first dry length to a second dry length larger than the first dry length by a magnification factor in the range of from about 1.1 to about 1.5 and stretching the membrane in the transverse direction from a first dry width to a second width that is larger than the first dry width by a magnification factor in the range of from about 1.1 to about 1.3; and then (9) decreasing the second dry width to a third dry width, the third dry width being in the range of from the first dry width to about 1.1 times larger than the first dry width.

An optional hot solvent treatment step, an optional heat setting step, an optional cross-linking step with ionizing radiation, and an optional hydrophilic treatment step, etc., as described in PCT Publication No. WO 2008/016174 can be conducted if desired. Neither the number nor order of the optional steps is critical.

(1) Combining Resins and Diluent

The resin mixture as described above can be combined, e.g., by dry mixing or melt blending, and then the resin mixture can be combined with at least one diluent to produce a polyolefin-diluent mixture, e.g., a polyolefin solution. Alternatively, the resin mixture and diluent can be combined in a single step. The resins and solvents can be added sequentially, in parallel, or in a combination thereof. Alternatively, a resin mixture can produced by first combining at least a portion of the resins to make a resin composition, and then combining the resin composition with at least one membrane-forming solvent (and optionally additional portions of the resins and/or additional resins) to produce a resin solution. Optionally, the resin solution contains additives such as one or more of antioxidant, fine silicate powder (e.g., pore-forming material), etc. The amount of such additives is not critical, provided they are not present in amounts large enough to adversely affect the membrane's properties. Generally, the amount of such additives in aggregate does not exceed 1 wt. %, based on the weight of the polyolefin solution.

The use of a diluent comprising liquid membrane-forming solvent can make it less difficult to conduct stretching at relatively high magnifications. The diluent can be one or more liquid solvents such as aliphatic, alicyclic or aromatic hydrocarbons such as nonane, decane, decalin, p-xylene, undecane, dodecene; liquid paraffin; mineral oil distillates having boiling points comparable to those of the above hydrocarbons; and phthalates liquid at room temperature, such as dibutyl phthalate, dioctyl phthalate, etc. The use of a non-volatile solvent such as liquid paraffin can make it easier to obtain a gel-like molding (or gel-like sheet) having a stable solvent content. In an embodiment, one or more solid solvents, which are miscible with the resin solution or resin composition during melt-blending but solid at room temperature, may be added to the liquid solvent. Such solid solvents can be, e.g., stearyl alcohol, ceryl alcohol, paraffin waxes, etc. Solid solvent can be used without liquid solvent, but in this case it can be more difficult to evenly stretch the gel-like sheet during step (4).

In an embodiment, the viscosity of the liquid solvent ranges from about 30 cSt to about 500 cSt, or from about 30 cSt to about 200 cSt, when measured at a temperature of 25.0° C. Although the choice of viscosity is not particularly critical, when the viscosity at 25.0° C. is less than about 30 cSt, the polyolefin solution might foam, resulting in difficulty in blending. On the other hand, when the viscosity is more than about 500 cSt, it can be more difficult to remove the solvent during step (5). The polyolefin solution can contain additives such as one or more antioxidant. In an embodiment, the amount of such additives does not exceed 1 wt. % based on the weight of the polyolefin solution.

Optionally, the amount of diluent used to produce the extrudate is in the range, e.g., of from about 25.0 wt. % to about 99.0 wt. % based on the weight of the combined diluent and polymer, with the balance being polymer.

(2) Extruding

In an embodiment, the combined resin composition and the diluent (a membrane-forming solvent in this case) are conducted from an extruder to a die.

The extrudate or cooled extrudate should have an appropriate thickness to produce, after the stretching steps, a final membrane having the desired thickness (generally 3 µm or more). For example, the extrudate can have a thickness in the range of about 0.1 mm to about 10 mm, or about 0.5 mm to 5 mm. Extrusion is generally conducted with the mixture of resin composition and membrane-forming solvent in the molten state. When a sheet-forming die is used, the die lip is generally heated to an elevated temperature, e.g., in the range of 140° C. to 250° C. Suitable process conditions for accomplishing the extrusion are disclosed in PCT Publications No. WO 2007/132942 and WO 2008/016174, both of which are incorporated by reference herein in their entirety.

(3) Optional Extrudate Cooling

Optionally the extrudate can be exposed to a temperature in the range of 5.0° C. to 40.0° C. to form a cooled extrudate. Cooling rate is not particularly critical. For example, the extrudate can be cooled at a cooling rate of at least about 30.0° C./minute until the temperature of the extrudate (the cooled temperature) is approximately equal to the extrudate's gelation temperature (or lower). Process conditions for cooling can be the same as those disclosed in PCT Publications No. WO 2008/016174 and WO 2007/132942, for example.

(4) Stretching the Extrudate

The extrudate or cooled extrudate is stretched in at least one direction. The extrudate can be stretched by, for example, a tenter method, a roll method, an inflation method or a combination thereof, as described in PCT Publication No. WO 2008/016174, for example. The stretching may be conducted monoaxially or biaxially. Optionally, the cooled extrudate is biaxially stretched, with the first stretching axis oriented approximately parallel to the extrudate's machine direction and the second stretching axis oriented approximately parallel to the extrudate's transverse direction. In the case of biaxial stretching, any of simultaneous biaxial stretching, sequential stretching or multi-stage stretching (for instance, a combination of the simultaneous biaxial stretching and the sequential stretching) can be used, though simultaneous biaxial stretching is preferable. When biaxial stretching is used, the amount of magnification need not be the same in each stretching direction.

The stretching magnification factor can be, for example, 2 fold or more, preferably 3 to 30 fold in the case of monoaxial stretching. In the case of biaxial stretching, the stretching magnification factor can be, for example, 3 fold or more in any direction (e.g., in the range of 3 fold to 30 fold), such as 16 fold or more, e.g., 25 fold or more, in area magnification. An example of this stretching step includes stretching from about 9 fold to about 49 fold in area magnification. Again, the amount of stretch in each direction need not be the same. The magnification factor operates multiplicatively on film size. For example, a film having an initial width (TD) of 2.0 cm that is stretched in TD to a magnification factor of 4 fold will have a final width of 8.0 cm. The machine direction ("MD") is a direction in the plane of the film (the extrudate in this instance) which is oriented approximately along the direction of travel as the film is formed, i.e., the longest axis of the film during production. The transverse direction ("TD") also lies in the plane of the film and is approximately perpendicular to both the machine direction and a third axis approximately parallel to the thickness of the film. The definitions of TD and MD are the same in both batch and continuous processing.

Optionally, the stretching is conducted while exposing the extrudate to a temperature (the stretching temperature) in the range of from about Tcd to Tm, where in this instance Tcd and Tm are the crystal dispersion temperature and melting peak of the polymer having the lowest melting peak among the polymers used to produce the extrudate. The crystal dispersion temperature is determined by measuring the temperature characteristics of dynamic viscoelasticity according to ASTM D 4065. In an embodiment, the stretching temperature is in the range of from 90.0° C. to 125.0° C.; e.g., from about 100° C. to 125.0° C., such as from 105° C. to 125.0° C. Optionally, the stretching temperature is ≤(Tm−10.0° C.).

In an embodiment, the stretched extrudate undergoes an optional thermal treatment before diluent removal. In the thermal treatment, the stretched extrudate is exposed to a temperature that is higher (warmer) than the temperature to which the extrudate is exposed during stretching. The planar dimensions of the stretched extrudate (length in MD and width in TD) can be held constant while the stretched extrudate is exposed to the higher temperature. Since the extrudate contains polyolefin and diluent, its length and width are referred to as the "wet" length and "wet" width. In an embodiment, the stretched extrudate is exposed to a temperature in the range of 120.0° C. to 125.0° C. for a time sufficient to thermally treat the extrudate, e.g., a time in the range of 1 second to 100 seconds while the wet length and wet width are held constant, e.g., by using tenter clips to hold the stretched extrudate along its perimeter. In other words, during the thermal treatment, there is no magnification or demagnification (i.e., no significant dimensional change) of the stretched extrudate in MD or TD.

In this step and in other steps such as dry orientation and heat setting where the sample (e.g., the extrudate, dried extrudate, membrane, etc.) is exposed to an elevated temperature, this exposure can be accomplished by heating air and then conveying the heated air into proximity with the sample. The temperature of the heated air, which is generally controlled at a set point equal to the desired temperature, is then conducted toward the sample through a plenum for example. Other methods for exposing the sample to an elevated temperature, including conventional methods such as exposing the sample to a heated surface, infra-red heating in an oven, etc. can be used with or instead heated air.

(5) Diluent Removal

In an embodiment, at least a portion of the diluent is removed (or displaced) from the stretched extrudate to form a membrane. A displacing (or "washing") solvent can be used to remove (wash away, or displace) the diluent, as described in PCT Publication No. WO 2008/016174, for example.

(6) Drying the Membrane

In an embodiment, at least a portion of any remaining volatile species (e.g., washing solvent) is removed from the membrane after diluent removal. Any method capable of removing the washing solvent can be used, including conventional methods such as heat-drying, wind-drying (moving air), etc. Process conditions for removing volatile species such as washing solvent can be the same as those disclosed in PCT Publication No. WO 2008/016174, for example.

(7) Thermal Treatment

In am embodiment, the membrane is subjected to a thermal treatment such as heat setting. During heat-setting, the membrane is, e.g., exposed to a temperature in the range of from about Tcd to about Tm, for example from 100.0° C. to 135.0° C., from about 105.0° C. to 133.0° C. or 110.0° C. to 131.0° C. In this instance, Tm is the melting peak of the polymer having the lowest melting peak among the polymers used to produce the membrane.

(8) Stretching the Membrane (Dry Orientation)

Optionally, the dried membrane of the step (6) can be stretched (called "dry stretching" since at least a portion of the diluent has been removed or displaced) in at least one direction between the step (6) and (7). A dried membrane that has been dry stretched is called an "oriented" membrane. Before dry stretching, the dried membrane has an initial size in MD (a first dry length) and an initial size in TD (a first dry width). As used herein, the term "first dry width" refers to the size of the dried membrane in the TD prior to the start of dry orientation. The term "first dry length" refers to the size of the dried membrane in the MD prior to the start of dry orientation. Tenter stretching equipment of the kind described in WO 2008/016174 can be used, for example.

The dried membrane can be stretched in MD from the first dry length to a second dry length that is larger than the first dry length by a magnification factor (the "MD dry stretching magnification factor") in the range of from about 1.1 to about 1.5. When TD dry stretching is used, the dried membrane can be stretched in TD from the first dry width to a second dry width that is larger than the first dry width by a magnification factor (the "TD dry stretching magnification factor"). Optionally, the TD dry stretching magnification factor is ≤the MD dry stretching magnification factor. The TD dry stretching magnification factor can be in the range of from about 1.1 to about 1.3. The dry stretching (also called re-stretching since the membrane-forming solvent-containing extrudate has already been stretched) can be sequential or simultaneous in MD and TD. Since TD heat shrinkage generally has a greater effect on battery properties than does MD heat shrinkage, the amount of TD magnification generally does not exceed the amount of MD magnification. When TD dry stretching is used, the dry stretching can be simultaneous in MD and TD or sequential. When the dry stretching is sequential, generally MD stretching is conducted first followed by TD stretching.

The dry stretching can be conducted while exposing the dried membrane to a temperature ≤Tm, e.g., in the range of from about Tcd-30.0° C. to Tm. In this instance Tm is the melting peak of the polymer having the lowest melting peak among the polymers used to produce the membrane. In an embodiment, the stretching temperature is conducted with the membrane exposed to a temperature in the range of from about 70.0° C. to about 135.0° C., for example from about 75.0° C. to about 133.0° C. In an embodiment, the MD stretching is conducted before TD stretching, and (i) the MD stretching is conducted while the membrane is exposed to a first temperature in the range of Tcd-30.0° C. to about Tm-10.0° C., for example 70.0° C. to 135.0° C., or about 80.0° C. to about 131.0° C. and (ii) the TD stretching is conducted while the membrane is exposed to a second temperature that is higher than the first temperature but lower than Tm, for example 70.0° C. to 135.0° C., or about 105.0° C. to about 133.0° C., or about 110.0° C. to about 131.0° C.

In an embodiment, the total MD dry stretching magnification factor is in the range of from about 1.1 to about 1.5, such as 1.2 to 1.4; the total TD dry stretching magnification factor is in the range of from about 1.1 to about 1.3, such as 1.15 to 1.25; the MD dry stretching is conducted before the TD dry stretching, the MD dry stretching is conducted while the membrane is exposed to a temperature in the range of 80.0° C. to about 120.0° C., and the TD dry stretching is conducted while the membrane is exposed to a temperature in the range of 115.0° C. to about 130.0° C., but less than Tm, where Tm is the melting peak of the polymer having the lowest melting peak among the polymers used to produce the extrudate.

The stretching rate is preferably 3%/second or more in the stretching direction (MD or TD), and the rate can be independently selected for MD and TD stretching. The stretching rate is preferably 5%/second or more, more preferably 10%/second or more, e.g., in the range of 5%/second to 25%/second. Though not particularly critical, the upper limit of the stretching rate is preferably 50%/second to prevent rupture of the membrane.

(9) Controlled Reduction of the Membrane's Width (Heat-Relaxing of the Membrane)

Following the dry stretching, the dried membrane is optionally subjected to a controlled reduction in width from the second dry width to a third dry width, the third dry width being in the range of from the first dry width to about 1.1 times larger than the first dry width. The width reduction generally conducted while the membrane is exposed to a temperature ≥Tcd-30° C., but no greater than Tm of the polyethylene having the lowest Tm among the polyethylenes used to produce the membrane. For example, during width reduction the membrane can be exposed to a temperature in the range of from 70.0° C. to about 130.0° C., such as from about 115° C. to about 130.0° C., e.g., from about 120° C. to about 128° C. In an embodiment, the decreasing of the membrane's width is conducted while the membrane is exposed to a temperature that is lower than Tm of the polyethylene having the lowest Tm among the polyethylenes used to produce the membrane. In an embodiment, the third dry width is in the range of from 1.0 times larger than the first dry width to about 1.1 times larger than the first dry width.

It is believed that exposing the membrane to a temperature during the controlled width reduction that is ≥the temperature to which the membrane was exposed during the TD stretching leads to greater resistance to heat shrinkage in the finished membrane.

[3] Structure, Properties, and Composition

In a particular embodiment, the membrane has an air permeability ≤$1.0 \times 10^3$ seconds/100 $cm^3$/20 µm and optionally one or more of a TD heat shrinkage at 105° C.≤2.1%, a TD heat shrinkage at 170.0° C.≤35.0%, and a TD shrinkage at 130.0° C.≤25.0%. The membrane comprises 22.0 wt. % to 40.0 wt. % of the PMP, based on the weight of the membrane. In an embodiment, the PMP is a homopolymer or copolymer of methylpentene with propylene, butene, hexene or octene and the PMP has a Tm in the range of 200.0° C. to 236.0° C. and an MFR≤80 dg/min.

In an embodiment, the membrane's thickness is generally in the range of from about 1.0 µm to about $1.0 \times 10^2$ µm, e.g., from about 5.0 µm to about 30.0 µm. The thickness of the microporous membrane can be measured by a contact thickness meter at 1 cm longitudinal intervals over the width of 20 cm, and then averaged to yield the membrane thickness. Thickness meters such as the Litematic available from Mitsutoyo Corporation are suitable. This method is also suitable for measuring thickness variation after heat compression, as described below. Non-contact thickness measurements are also suitable, e.g., optical thickness measurement methods.

The final microporous membrane generally comprises the polymer used to produce the extrudate. A small amount of diluent or other species introduced during processing can also be present, generally in amounts less than 1 wt. % based on the weight of the microporous membrane. A small amount of polymer molecular weight degradation might occur during processing, but this is acceptable. In an embodiment, molecular weight degradation during processing, if any, causes the value of MWD of the polymer in the membrane to differ from the MWD of the polymer used to produce the membrane by no more than, e.g., about 10%, or no more than about 1%, or no more than about 0.1%.

While the extrudate and the microporous membrane can contain other materials such as inorganic species (e.g., species containing silicon and/or aluminum atoms), and/or heat-resistant polymers such as those described in PCT Publications WO 2007/132942 and WO 2008/016174, these are not required. In an embodiment, the extrudate and membrane are substantially free of such materials. Substantially free in this context means the amount of such materials in the microporous membrane is less than 1.0 wt. %, based on the total weight of the polymer used to produce the extrudate.

The microporous membrane can be a monolayer membrane. Optionally, the microporous membrane further comprises a second membrane which can be, e.g., a porous or microporous layer on (e.g., in face-to-face contact) with the microporous membrane. For example, the microporous membrane can be a multi-layer membrane wherein at least one layer of the multi-layer membrane comprises polymethylpentene in an amount in the range of 22.0 wt. % to 40.0 wt. %, based on the weight of the membrane. Optionally, such a multi-layer membrane has an air permeability $\leq 1.0 \times 10^3$ seconds/100 cm$^3$/20 µm, and one or more of a TD heat shrinkage at 105.0° C.$\leq$2.1%, a TD heat shrinkage at 170° C.$\leq$35% and a TD heat shrinkage at 130° C.$<$25%. Such a membrane can be produced by coextrusion or lamination for example, or by a coating process for applying layers to a microporous membrane.

In an embodiment, the microporous membrane is a monolayer or multilayer membrane having one or more of the following properties.

(a) Normalized Air Permeability $\leq 1.0 \times 10^3$ Sec/100 Cm$^3$/20 µm

In an embodiment, the membrane's normalized air permeability (Gurley value, expressed as the air permeability of an equivalent membrane having a thickness of 20 µm) is $\leq 1.0 \times 10^3$ seconds/100 cm$^3$/20 µm, e.g., in the range of about 10.0 seconds/100 cm$^3$/20 µm to $1.0 \times 10^3$ seconds/100 cm$^3$/20 µm, such as 50.0 seconds/100 cm$^3$/20 µm to 750 seconds/100 cm$^3$/20 µm. Since the air permeability value is normalized to the value for an equivalent membrane having a film thickness of 20 µm, the membrane's air permeability value is expressed in units of "seconds/100 cm$^3$/20 µm". Normalized air permeability is measured according to JIS P8117, and the results are normalized to the permeability value of an equivalent membrane having a thickness of 20 µm using the equation A=20 µm*(X)/T$_1$, where X is the measured air permeability of a membrane having an actual thickness T$_1$ and A is the normalized air permeability of an equivalent membrane having a thickness of 20 µm.

(b) Porosity in the Range of from about 25% to about 80%

In an embodiment, the membrane has a porosity $\geq$25.0%, e.g., in the range of about 25.0% to about 80.0%, or 30.0% to 60.0%. The membrane's porosity is measured conventionally by comparing the membrane's actual weight to the weight of an equivalent non-porous membrane of the same composition (equivalent in the sense of having substantially the same length, width, and thickness). Porosity is then determined using the formula: Porosity %=100×(w2−w1)/w2, wherein "w1" is the actual weight of the microporous membrane and "w2" is the weight of the equivalent non-porous membrane having the same size and thickness.

(c) Meltdown Temperature $\geq$180.0° C.

In an embodiment, meltdown temperature $\geq$180.0° C., e.g., the membrane has a meltdown temperature in the range of 180.0° C. to about 210.0° C., e.g., from about 185° C. to about 200.0° C. Meltdown temperature is measured by the following procedure: A rectangular sample of 3 mm×50 mm is cut out of the microporous membrane such that the long axis of the sample is aligned with the microporous membrane's TD and the short axis is aligned MD. The sample is set in a thermomechanical analyzer (TWEIGHT6000 available from Seiko Instruments, Inc.) at a chuck distance of 10 mm, i.e., the distance from the upper chuck to the lower chuck is 10 mm. The lower chuck is fixed and a load of 19.6 mN applied to the sample at the upper chuck. The chucks and sample are enclosed in a tube which can be heated. Starting at 30.0° C., the temperature inside the tube is elevated at a rate of 5° C./minute, and sample length change under the 19.6 mN load is measured at intervals of 0.5 second and recorded as temperature is increased. The temperature is increased to 200.0° C. The meltdown temperature of the sample is defined as the temperature at which the sample breaks.

(d) TD Heat Shrinkage at 105° C.$\leq$2.1%

In an embodiment, the membrane has a TD heat shrinkage at 105.0° C.$\leq$2.1%, e.g., from about 0.5% to about 2.0%. When the TD heat shrinkage at 105.0° C. is larger than 2.1%, it can be difficult to protect short-circuit at high temperature by the microporous film used as a battery separator. Optionally, the membrane has an MD heat shrinkage at 105.0° C.$\leq$2.5%, e.g., in the range of about 0.5% to 2.0%.

The membrane's heat shrinkage in orthogonal planar directions (e.g., MD or TD) at 105.0° C. (the "105.0° C. heat shrinkage") is measured as follows:

(i) Measure the size of a test piece of microporous membrane at ambient temperature in both MD and TD, (ii) expose the test piece to a temperature of 105.0° C. for 8 hours with no applied load, and then (iii) measure the size of the membrane in both MD and TD. The heat (or "thermal") shrinkage in either the MD or TD can be obtained by dividing the result of measurement (i) by the result of measurement (ii) and expressing the resulting quotient as a percent.

(e) TD Heat Shrinkage at 130° C.$\leq$25.0% and/or TD Heat Shrinkage at 170° C.$\leq$35.0%

In an embodiment, the membrane has a TD heat shrinkage at 130° C.$\leq$25.0%, for example in the range of from about 1.0% to about 23.0%, and/or a TD heat shrinkage at 170° C.$\leq$35.0%, e.g., from about 1.0% to about 30.0%.

The measurement of 130° C. and 170° C. heat shrinkage is slightly different from the measurement of heat shrinkage at 105° C., reflecting the fact that the edges of the membrane parallel to the transverse direction are generally fixed within the battery, with a limited degree of freedom allowed for expansion or contraction (shrinkage) in TD, particularly near the center of the edges parallel to MD. Accordingly, a square sample of microporous film measuring 50 mm along TD and 50 mm along MD is mounted in a frame, with the edges parallel to TD fixed to the frame (e.g., by tape) leaving a clear aperture of 35 mm in MD and 50 mm in TD. The frame with sample attached is then exposed to a temperature of 130° C. or 170° C. for thirty minutes, and then cooled. TD heat shrinkage generally causes the edges of the film parallel to MD to bow slightly inward (toward the center of the frame's aperture). The shrinkage in TD (expressed as a percent) is equal to the length of the sample in TD before heating divided by the narrowest length (within the frame) of the sample in TD after heating times 100 percent.

(f) Shutdown Temperature ≤135.0° C.

The microporous membrane's shutdown temperature is measured by the method disclosed in PCT Publication No. WO 2007/052663, which is incorporated by reference herein in its entirety. According to this method, the microporous membrane is exposed to an increasing temperature (5.0° C./minute beginning at 30.0° C.) while measuring the membrane's air permeability. The microporous membrane's shutdown temperature is defined as the temperature at which the microporous membrane's air permeability (Gurley Value) first exceeds $1.0 \times 10^5$ seconds/100 cm³. The microporous membrane's air permeability is measured according to JIS P8117 using an air permeability meter (EGO-1T available from Asahi Seiko Co., Ltd.).

In an embodiment, the membrane has a shutdown temperature ≤135.0° C., e.g., in the range of 115.0° C. to 134.0° C., such as 120.0° C. to 130.0° C. Using the PMP to produce the microporous membrane is not believed to significantly affect the membrane's shutdown temperature.

(g) Normalized Pin Puncture Strength ≥$1.5 \times 10^3$ mN/20 μm

In an embodiment, the membrane has a normalized pin puncture strength ≥$1.5 \times 10^3$ mN/20 μm, or ≥$2.0 \times 10^3$ mN/20 μm, or ≥$3.0 \times 10^3$ mN/20 μm e.g., in the range of 3,500 mN/20 μm to 10,000 mN/20 μm. The pin puncture strength ("S") is normalized to a value at a membrane thickness of 20 μm using the equation $S_2 = 20 \mu m \cdot (S_1)/T_1$, where $S_1$ is the measured pin puncture strength, $S_2$ is the normalized pin puncture strength, and $T_1$ is the average thickness of the membrane.

[4] Battery Separator and Battery

The microporous membrane of this invention has well-balanced heat shrinkage and air permeability, and is permeable to liquid (aqueous and non-aqueous) at atmospheric pressure. Thus, the microporous membrane can be used as a battery separator, filtration membrane, and so on. The microporous membrane is particularly useful as a secondary battery separator, such as in a nickel-hydrogen battery, nickel-cadmium battery, nickel-zinc battery, silver-zinc battery, lithium-ion battery, lithium-ion polymer battery separator. In an embodiment, the membrane is used as battery separator film in lithium-ion secondary batteries.

Such batteries are described in PCT Publication No. WO 2008/016174 which is incorporated by reference herein in its entirety.

This invention will be described in more detail with reference to Examples below without intention of restricting the scope of this invention.

EXAMPLES

Example 1

The microporous membrane is produced from a mixture of 76 wt. % diluent and 24 wt. % polymer, based on the weight of the mixture. The polymer comprises (a) 35.0 wt. % of a PMP (Mitsui Chemicals, Inc. TPX: MX004) having an MFR of 25.0 and a Tm of 227.0° C., (b) 31.7 wt. % of a high density polyethylene ("HDPE") having an Mw of $5.6 \times 10^5$ and a Tm of 136.0° C., and (c) 33.3 wt. % of an ultra-high molecular weight polyethylene ("UHMWPE") having an Mw of $1.9 \times 10^6$ and a Tm of 133.7° C., the weight percents being based on the weight of the polymer in the mixture. The resin-diluent mixture is combined in an extruder with 0.5 wt. % of tetrakis [methylene-3-(3,5-ditertiary-butyl-4-hydroxyphenyl)-propionate] methane (antioxidant), based on the weight of the polyethylene in the mixture.

The mixture is conducted from the extruder to a T-die, and extruded in about 1.0-mm-thick sheet shape at the temperature around 210° C. The extrudate is cooled by contacting it with a cooling roll controlled at 20° C. to form a gel-like sheet. The gel-like sheet is simultaneously biaxially stretched by a batch-type stretching machine to 5-fold in both MD and TD while exposing the extrudate to a temperature of 120° C. The extrudate is then fixed to an aluminum frame plate of 20 cm×20 cm, and immersed in a washing bath of methylene chloride controlled at room temperature, and washed while swaying at 100 rpm for 3 minutes to remove the liquid paraffin. The washed membrane was air-dried at room temperature. While holding the size of the membrane substantially constant, the membrane is then held heat-set at 125° C. for 10 minutes to produce the final microporous membrane.

Example 2

Example 1 is repeated except the polymer comprises 25.0 wt. % of the PMP, 40.0 wt. % of the HDPE, and 35.0 wt. % of the UHMWPE.

Example 3

Example 1 is repeated except the polymer comprises 23.0 wt. % of PMP, the PMP having an MFR of 23.0 dg/min and a Tm of 222° C. (Mitsui Chemicals, Inc. TPX: MX002), 22.0 wt. % of the HDPE, and 39.0 wt. % of the UHMWPE.

Example 4

Example 3 is repeated except the polymer comprises 33.3 wt % of the PMP, 33.4 wt. % of the HDPE, and 33.3 wt. % of UHMWPE.

Example 5

Example 3 is repeated except the polymer comprises 33.3 wt. % of the PMP, 16.7 wt. % of the HDPE, 33.3 wt. % of the UHMWPE, and 16.7 wt. % of a polypropylene having an Mw of $9.9 \times 10^5$ and a Tm of 163.8° C.

Example 6

Example 1 is repeated except the polymer comprises 33.3 wt. % of a PMP having an MFR of 21 and a Tm 235° C. (Mitsui Chemicals, Inc. TPX: R18), 33.4 wt. % of the HDPE, 33.3 wt. % of the UHMWPE.

Comparative Example 1

Example 4 is repeated except the polymer comprises 82.0 wt. % of the HDPE, and 18.0 wt. % of the UHMWPE.

Comparative Example 2

Comparative Example 1 is repeated except the polymer content in melt blend is 25%, the stretching temperature is 115.0° C., and the heat setting temperature is 115.0° C.

Comparative Example 3

Example 1 is repeated except the polymer comprises 41.7 wt. % of the PMP, 18.7 wt. % of the HDPE, and 41.7 wt. % of the UHMWPE.

Comparative Example 4

Example 3 is repeated except the polymer comprises 16.7 wt. % of the PMP, 50.0 wt. % of the HDPE, and 33.3 wt. % of the UHMWPE.

Comparative Example 5

Example 3 is repeated except the polymer comprises 42.8 wt. % of the PMP, 28.6 wt. % of the HDPE, and 28.6 wt. % of the UHMWPE.

Comparative Example 6

Example 3 is repeated except the polymer comprises 50.0 wt. % of the PMP, 25.0 wt. % of the HDPE, and 25.0 wt. % of the UHMWPE.

Comparative Example 7

Example 1 is repeated except the polymer comprises 33.3 wt. % of a PMP having an MFR of 180 dg/min. and a Tm of 238° C. (Mitsui Chemicals, Inc. TPX: DX820), 33.4 wt. % of the HDPE, and 33.3 wt. % of the UHMWPE.

Comparative Example 8

Example 1 is repeated except the polymer comprises 33.3 wt. % of a PMP having an MFR of 100 dg/min. and a Tm of 223° C. (Mitsui Chemicals, Inc. TPX: DX310), 33.4 wt. % of the HDPE, and 33.3 wt. % of the UHMWPE.

Comparative Example 9

Example 3 is repeated except the polymer comprises 10.0 wt. % of the PMP, 87.0 wt. % of the HDPE, 3.0 wt. % of the UHMWPE, the stretching temperature is 112.5° C., and the heat setting temperature is 128.2° C.

Comparative Example 10

Comparative Example 9 is repeated with a dry orientation temperature of 112.5° C., a dry orientation magnification (TD) of 1.4, and a heat setting temperature of 130.0° C.

As is clear from Table 1, the microporous membranes of Examples 1 to 6 have a TD heat shrinkage at 105.0° C. ≤2.1%, a meltdown temperature ≥180.0° C. and an air permeability ≤1.0×10³ seconds/100 cm³/20 μm. They also have a TD heat shrinkage at 170.0° C. ≤35.0% and a TD heat shrinkage at 130.0° C. ≤25.0%. They have good balances among heat shrinkage, meltdown temperature and air permeability, and have good values of TD heat shrinkage at 130.0° C. and 170.0° C. Particularly, the microporous membranes in Examples 1, 2 and 5 exhibit a desirable balance of these properties. The membranes of Comparative Examples 1 to 4 and 7-8 have higher heat shrinkage at 105.0° C. The membranes of Comparative Examples 1, 2, 4, 8, 9 and 10 have lower meltdown temperature. The membranes of Comparative Examples 4 and 5 have poor permeability; it is believed as a result of the PMP content being too large. The membranes of Comparative Examples 1, 3, 7, 9 and 10 break at 170.0° C., and the membrane of Comparative Example 8 have higher heat shrinkage at 170.0° C. The membranes of Comparative Example 1 have higher heat shrinkage at 130.0° C. It is believed that the MFR of the PMP of Comparative Examples 7 and 8 is too large, which increases the membrane's heat shrinkage. It is believed that PMP content of Comparative Examples 1 and 2 is too high, which reduces meltdown temperature and increases heat shrinkage.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

TABLE 1

|  |  | Example 1 | Example 2 | Example 3 | Example 4 | Example 5 | Example 6 |
|---|---|---|---|---|---|---|---|
| Resin Composition | | | | | | | |
| PMP | Grade | MX004 | MX004 | MX002 | MX002 | MX002 | R18 |
|  | MFR (dg/min.) | 25 | 25 | 21 | 21 | 21 | 21 |
|  | Tm (° C.) | 227 | 227 | 222 | 222 | 222 | 235 |
|  | Content (wt. %) | 35.0 | 25.0 | 23.0 | 33.3 | 33.3 | 33.3 |
| HDPE | Mw | $5.6 \times 10^5$ | $5.6 \times 10^5$ | $5.6 \times 10^5$ | $5.6 \times 10^5$ | $5.6 \times 10^5$ | $5.6 \times 10^5$ |
|  | Tm (° C.) | 136.0 | 136.0 | 136.0 | 136.0 | 136.0 | 136.0 |
|  | Content (wt. %) | 31.7 | 40.0 | 22.0 | 33.4 | 16.7 | 33.4 |
| UHMWPE | Mw | $1.9 \times 10^6$ | $1.9 \times 10^6$ | $1.9 \times 10^6$ | $1.9 \times 10^6$ | $1.9 \times 10^6$ | $1.9 \times 10^6$ |
|  | Tm (° C.) | 133.7 | 133.7 | 133.7 | 133.7 | 133.7 | 133.7 |
|  | Content (wt. %) | 33.3 | 35 | 39.0 | 33.3 | 33.3 | 33.3 |
| PP | Mw | — | — | — | — | $9.9 \times 10^5$ | — |
|  | Tm (° C.) | — | — | — | — | 163.8 | — |
|  | Content (wt. %) | — | — | — | — | 16.7 | — |

TABLE 1-continued

|  | Example 1 | Example 2 | Example 3 | Example 4 | Example 5 | Example 6 |
|---|---|---|---|---|---|---|
| Processing Condition | | | | | | |
| Polymer content (wt. %) in Melt Blend Extruction | 24 | 24 | 24 | 24 | 24 | 24 |
| Extrusion Temperature (° C.) | 210 | 210 | 210 | 210 | 210 | 210 |
| Stretching | | | | | | |
| Temperature (° C.) | 120.0 | 120.0 | 120.0 | 120.0 | 120.0 | 120.0 |
| Magnification (MD × TD)[1] | 5 × 5 | 5 × 5 | 5 × 5 | 5 × 5 | 5 × 5 | 5 × 5 |
| Dry Orientation | | | | | | |
| Temperature (° C.) | — | — | — | — | — | — |
| Magnification (TD) | — | — | — | — | — | — |
| Heat Setting | | | | | | |
| Temperature (° C.) | 125.0 | 125.0 | 125.0 | 125.0 | 125.0 | 125.0 |
| Properties | | | | | | |
| Average Thickness (μm) | 43.3 | 24.5 | 24.5 | 50.1 | 47.4 | 111.9 |
| Porosity (%) | 55.3 | 52.4 | 52.4 | 34.9 | 64.6 | 60.8 |
| Normalized Air Permeability (sec/100 cm3/20 μm) | 411 | 315 | 357 | 692 | 406 | 59.1 |
| Meltdown Temperature (° C.) | 196.7 | (2) | 198.4 | 191.1 | 194.1 | (2) |
| TD Heat Shrinkage at 105° C. (%) | 1.7 | 1.9 | 2.0 | 1.2 | 1.9 | 1.8 |
| TD Heat Shrinkage at 130° C. (%) | 6.1 | 5.7 | 22.8 | (2) | 10.8 | 6.5 |
| TD Heat Shrinkage at 170° C. (%) | 16.2 | 14.8 | 23.7 | (2) | 24.5 | 29.1 |

Note:
[1]MD represents machine direction and TD represents transverse direction.
[2]Not measured

TABLE 2

|  |  | Comparative Example 1 | Comparative Example 2 | Comparative Example 3 | Comparative Example 4 | Comparative Example 5 |
|---|---|---|---|---|---|---|
| Resin Composition | | | | | | |
| PMP | Grade | — | — | MX004 | MX002 | MX002 |
|  | MFR (dg/min.) | — | — | 25 | 21 | 21 |
|  | Tm (° C.) | — | — | 227 | 222 | 222 |
|  | Content (wt. %) | — | — | 41.7 | 16.7 | 42.8 |
| HDPE | Mw | $5.6 \times 10^5$ | $5.6 \times 10^5$ | $5.6 \times 10^5$ | $5.6 \times 10^5$ | $5.6 \times 10^5$ |
|  | Tm (° C.) | 136.0 | 136.0 | 136.0 | 136.0 | 136.0 |
|  | Content (wt. %) | 82 | 82 | 16.7 | 50.0 | 28.6 |
| UHMWPE | Mw | $1.9 \times 10^6$ | $1.9 \times 10^6$ | $1.9 \times 10^6$ | $1.9 \times 10^6$ | $1.9 \times 10^6$ |
|  | Tm (° C.) | 133.7 | 133.7 | 133.7 | 133.7 | 133.7 |
|  | Content (wt. %) | 18 | 18 | 41.7 | 33.3 | 28.6 |
| PP | Mw | — | — | — | — | — |
|  | Tm (° C.) | — | — | — | — | — |
|  | Content (wt. %) | — | — | — | — | — |
| Processing Condition | | | | | | |
| Polymer content (wt. %) in Melt Blend Extruction | | 24 | 25 | 24 | 24 | 24 |
| Extrusion Temperature (° C.) | | 210 | 210 | 210 | 210 | 210 |
| Stretching | | | | | | |
| Temperature (° C.) | | 120.0 | 115.0 | 120.0 | 120.0 | 120.0 |
| Magnification (MD × TD)[1] | | 5 × 5 | 5 × 5 | 5 × 5 | 5 × 5 | 5 × 5 |
| Dry Orientation | | | | | | |
| Temperature (° C.) | | — | — | — | — | — |
| Magnification (TD) | | — | — | — | — | — |
| Heat Setting | | | | | | |
| Temperature (° C.) | | 125.0 | 115.0 | 125.0 | 125.0 | 125.0 |
| Properties | | | | | | |
| Average Thickness (μm) | | 39.3 | 20.7 | 54.3 | 20.1 | 50.3 |
| Porosity (%) | | 18.7 | 50.8 | 50.8 | 57.1 | 45.7 |
| Normalized Air Permeability (sec/100 cm3/20 μm) | | 269.1 | 214 | 1474 | 162 | 4967 |
| Meltdown Temperature (° C.) | | 148.0 | 147.0 | 191.1 | 149.6 | 207.6 |

TABLE 2-continued

|  | | | | | |
|---|---|---|---|---|---|
| TD Heat Shrinkage at 105° C. (%) | 2.9 | 5.6 | 2.6 | 3.1 | 2.0 |
| TD Heat Shrinkage at 130° C. (%) | 34.7 | 35.0 | (2) | 24.6 | 9.8 |
| TD Heat Shrinkage at 170° C. (%) | break | break | 21.0 | 33.5 | 18.6 |

| | | Comparative Example 6 | Comparative Example 7 | Comparative Example 8 | Comparative Example 9 | Comparative Example 10 |
|---|---|---|---|---|---|---|
| Resin Composition | | | | | | |
| PMP | Grade | MX002 | DX820 | DX310 | MX002 | MX002 |
|  | MFR (dg/min.) | 21 | 180 | 100 | 21 | 21 |
|  | Tm (° C.) | 222 | 238 | 223 | 222 | 222 |
|  | Content (wt. %) | 50.0 | 33.3 | 33.3 | 10.0 | 10.0 |
| HDPE | Mw | $5.6 \times 10^5$ | $5.6 \times 10^5$ | $5.6 \times 10^5$ | $5.6 \times 10^5$ | $5.6 \times 10^5$ |
|  | Tm (° C.) | 136.0 | 136.0 | 136.0 | 136.0 | 136.0 |
|  | Content (wt. %) | 25.0 | 33.4 | 33.4 | 87.0 | 87.0 |
| UHMWPE | Mw | $1.9 \times 10^6$ | $1.9 \times 10^6$ | $1.9 \times 10^6$ | $1.9 \times 10^6$ | $1.9 \times 10^6$ |
|  | Tm (° C.) | 133.7 | 133.7 | 133.7 | 133.7 | 133.7 |
|  | Content (wt. %) | 25.0 | 33.3 | 33.3 | 3.0 | 3.0 |
| PP | Mw | — | — | — | — | — |
|  | Tm (° C.) | — | — | — | — | — |
|  | Content (wt. %) | — | — | — | — | — |
| Processing Condition | | | | | | |
| Polymer content (wt. %) in Melt Blend Extrusion | | 24 | 24 | 24 | 35 | 35 |
| Extrusion Temperature (° C.) | | 210 | 210 | 210 | 210 | 210 |
| Stretching | | | | | | |
| Temperature (° C.) | | 120.0 | 120.0 | 120.0 | 112.5 | 112.5 |
| Magnification (MD × TD)[1] | | 5 × 5 | 5 × 5 | 5 × 5 | 5 × 5 | 5 × 5 |
| Dry Orientation | | | | | | |
| Temperature (° C.) | | — | — | — | — | 130.0 |
| Magnification (TD) | | — | — | — | — | 1.4 |
| Heat Setting | | | | | | |
| Temperature (° C.) | | 125.0 | 125.0 | 125.0 | 128.2 | 130.0 |
| Properties | | | | | | |
| Average Thickness (μm) | | 51.8 | 43.4 | 36.4 | 7.0 | 7.0 |
| Porosity (%) | | 49.5 | 75.3 | 62.7 | 30.0 | 30.1 |
| Normalized Air Permeability (sec/100 cm3/20 μm) | | 9405 | 32.6 | 220 | 743 | 771 |
| Meltdown Temperature (° C.) | | 206.6 | — | 151.5 | 145.7 | 146.3 |
| TD Heat Shrinkage at 105° C. (%) | | 1.8 | 3.7 | 2.5 | 2.0 | 0.5 |
| TD Heat Shrinkage at 130° C. (%) | | (2) | 14.0 | 6.6 | (2) | (2) |
| TD Heat Shrinkage at 170° C. (%) | | 18.1 | break | 36.4 | break | break |

Note:
[1]MD represents machine direction and TD represents transverse direction.
[2]Not measured

What is claimed is:

1. A microporous membrane comprising at least one layer, the layer comprising polymethylpentene having an MFR of 22.0 dg/min to 28.0 dg/min and a Tm of 223.0° C. to 230.0° C. in an amount of 22.0 wt. % to 40.0 wt. % based on the weight of the layer, wherein the membrane further comprises polyethylene having an Mw of $1.0 \times 10^5$ to $2.0 \times 10^6$ and a Tm ≥130.0° C., the membrane having an air permeability ≤1.0× $10^3$ seconds/100 cm$^3$/20 μm, a TD heat shrinkage at 105° C. ≤2.1%, and a TD heat shrinkage at 130° C. <25.0%.

2. The microporous membrane of claim 1, wherein the amount of polymethylpentene is 22.0 wt. % to 38.0 wt. %.

3. The microporous membrane according to claim 1, wherein the microporous membrane has a TD heat shrinkage at 170° C. ≤35.0%.

4. The microporous membrane according to claim 1, wherein the membrane has an average thickness of 1.0 μm to $1.0 \times 10^2$ μm, a normalized air permeability of 50.0 seconds/100 cm$^3$/20 μm to 750 seconds/100 cm$^3$/20 μm, a porosity of 25.0% to 80.0%, a meltdown temperature ≥180.0° C., and a shutdown temperature ≤135.0° C.

5. The microporous membrane according to claim 1, wherein the membrane further comprises polypropylene, the polypropylene having an Mw of $1.0 \times 10^4$ to $1.0 \times 10^7$ and a Tm ≥150.0° C.

6. A battery separator film comprising the microporous membrane of claim 1.

7. The microporous membrane according to claim 1, wherein the polyethylene comprises (i) polyethylene having an Mw of $1.0 \times 10^5$ to $9.0 \times 10^5$ and a Tm >130.0° C. and (ii) polyethylene having an Mw of $1.0 \times 10^6$ to $1.5 \times 10^7$ and a Tm >130.0° C.

8. The microporous membrane according to claim 1, which is an extrudate comprising the polymethylpentene and the polyethylene.

* * * * *